(12) United States Patent
Sippel et al.

(10) Patent No.: US 10,443,420 B2
(45) Date of Patent: Oct. 15, 2019

(54) SEAL ASSEMBLY FOR GAS TURBINE ENGINE COMPONENTS

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Daniel K. Vetters, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 611 days.

(21) Appl. No.: 15/403,834

(22) Filed: Jan. 11, 2017

(65) Prior Publication Data

US 2018/0195401 A1     Jul. 12, 2018

(51) Int. Cl.
| | |
|---|---|
| *F01D 11/00* | (2006.01) |
| *F16J 15/06* | (2006.01) |
| *F01D 25/24* | (2006.01) |
| *F01D 9/04* | (2006.01) |

(52) U.S. Cl.
CPC ............ *F01D 11/005* (2013.01); *F01D 9/04* (2013.01); *F01D 25/24* (2013.01); *F16J 15/062* (2013.01); *F01D 25/246* (2013.01); *F05D 2240/11* (2013.01); *F05D 2240/55* (2013.01); *F05D 2300/6033* (2013.01); *Y02T 50/672* (2013.01)

(58) Field of Classification Search
CPC ...... F01D 11/005; F01D 9/04; F05D 2240/11; F05D 2240/55
See application file for complete search history.

(56) References Cited

U.S. PATENT DOCUMENTS

| | | |
|---|---|---|
| 1,423,466 A | 7/1922 | Snyder |
| 3,375,016 A | 3/1968 | Jellinek et al. |
| 3,661,197 A | 5/1972 | Peterson |
| 3,990,813 A | 11/1976 | Imai et al. |
| 4,524,980 A * | 6/1985 | Lillibridge ............ F01D 11/008 277/641 |
| 4,635,896 A | 1/1987 | Baker |
| 5,188,506 A | 2/1993 | Creevy |
| 5,188,507 A | 2/1993 | Sweeney |

(Continued)

FOREIGN PATENT DOCUMENTS

| | | |
|---|---|---|
| EP | 3106622 A1 | 12/2016 |
| JP | 58176402 A | 10/1983 |

(Continued)

OTHER PUBLICATIONS

GE Aviation, Jefferies Investor Visit, dated May 12, 2014, 78 pg. (p. 32).

(Continued)

*Primary Examiner* — Dwayne J White
*Assistant Examiner* — Jackson N Gillenwaters
(74) *Attorney, Agent, or Firm* — Barnes & Thornburg LLP

(57) ABSTRACT

A gas turbine engine assembly includes adjacent components and a seal assembly. The seal assembly is configured to block gasses from passing through the interface of the adjacent components.

20 Claims, 4 Drawing Sheets

(56) References Cited

U.S. PATENT DOCUMENTS

| | | | |
|---|---|---|---|
| 5,709,530 A * | 1/1998 | Cahill | F01D 11/005 277/644 |
| 5,868,398 A * | 2/1999 | Maier | F01D 11/005 277/643 |
| 5,988,975 A | 11/1999 | Pizzi | |
| 6,464,456 B2 | 10/2002 | Darolia et al. | |
| 6,808,363 B2 | 10/2004 | Darkins, Jr. et al. | |
| 6,832,484 B2 | 12/2004 | Hofmann et al. | |
| 6,893,214 B2 | 5/2005 | Alford et al. | |
| 7,080,513 B2 | 7/2006 | Reichert | |
| 7,347,425 B2 | 3/2008 | James | |
| 7,360,769 B2 | 4/2008 | Bennett | |
| 7,374,395 B2 | 5/2008 | Durocher et al. | |
| 7,520,721 B2 | 4/2009 | Hamlin et al. | |
| 7,744,096 B2 | 6/2010 | Kono | |
| 7,771,159 B2 | 8/2010 | Johnson et al. | |
| 7,870,738 B2 | 1/2011 | Zborovsky et al. | |
| 8,047,550 B2 | 11/2011 | Behrens et al. | |
| 8,047,773 B2 | 11/2011 | Bruce et al. | |
| 8,079,600 B2 | 12/2011 | Shojima et al. | |
| 8,157,511 B2 | 4/2012 | Pietrobon et al. | |
| 8,303,245 B2 | 11/2012 | Foster et al. | |
| 8,727,710 B2 * | 5/2014 | Propheter-Hinckley | F01D 11/005 415/139 |
| 8,790,067 B2 | 7/2014 | McCaffrey et al. | |
| 2004/0195783 A1 | 10/2004 | Akagi et al. | |
| 2008/0069688 A1 | 3/2008 | Harper et al. | |
| 2009/0097980 A1 | 4/2009 | Hayasaka et al. | |
| 2010/0247298 A1 | 9/2010 | Nakamura et al. | |
| 2012/0070272 A1 | 3/2012 | Prehn | |
| 2012/0171040 A1 * | 7/2012 | Walunj | F01D 5/22 416/220 R |
| 2013/0089414 A1 * | 4/2013 | Harding | F01D 11/005 415/182.1 |
| 2013/0156550 A1 | 6/2013 | Franks et al. | |
| 2013/0202433 A1 | 8/2013 | Hafner | |
| 2016/0017721 A1 | 1/2016 | Landwehr et al. | |
| 2016/0245108 A1 | 8/2016 | Sippel et al. | |
| 2016/0348521 A1 | 12/2016 | Sippel et al. | |

FOREIGN PATENT DOCUMENTS

| | | | |
|---|---|---|---|
| JP | 2000204901 A | 7/2000 | |
| JP | 5776208 B2 | 9/2015 | |

OTHER PUBLICATIONS

Extended EP Search Report completed on Apr. 30, 2018 and issued in connection with EP Appln. No. 17206340.6.

* cited by examiner

SEAL ASSEMBLY FOR GAS TURBINE ENGINE COMPONENTS

FIELD OF THE DISCLOSURE

The present disclosure relates generally to gas turbine engines, and more specifically to seals used in gas turbine engines.

BACKGROUND

Gas turbine engines are used to power aircraft, watercraft, power generators, and the like. Adjacent components in a gas turbine engine are often separated by a small gap sometimes called a split line. The small gap allows for variations in manufacturing tolerance of the adjacent components and for expansion/contraction of the components that occurs during operation of the gas turbine engine. The small gaps between adjacent components may be sealed to prevent the leakage of air through the small gaps during operation of the turbine engine.

SUMMARY

The present disclosure may comprise one or more of the following features and combinations thereof.

A gas turbine engine assembly may include a first component, a second component, and a seal assembly. The first component may comprise ceramic matrix materials. The first component may include a first panel formed to include a first chamfer surface and a first attachment feature that extends from the first panel to mount the first panel relative to other components within the gas turbine engine assembly. The second component may comprise ceramic matrix materials. The second component may include a second panel formed to include a second chamfer surface and a second attachment feature that extends from the second panel to mount the second panel relative to other components within the gas turbine engine assembly. The second component may be circumferentially spaced apart from the first component about a center axis of the gas turbine engine assembly to form a gap therebetween.

The seal assembly may be arranged between the first component and the second component to block gasses from passing through the gap. The seal assembly may include a first strip seal and a rod seal. The first strip seal may extend circumferentially into the first attachment feature and the second attachment feature to block gasses from passing between the first attachment feature and the second attachment feature. The rod seal may be arranged in a channel formed by the first chamfer surface and the second chamfer surface to block gasses from passing between the first panel and the second panel. The first strip seal may be interlocked with the rod seal for radial movement therewith to block gasses from passing between the rod seal and the first strip seal.

In some embodiments, the rod seal may include a body and a first hook arm. The body may extend axially relative to the center axis. The first hook arm may extend away from the body to form a first slot between the body and the first hook arm. A portion of the first strip seal may extend into the first slot to interlock the first strip seal and the rod seal.

In some embodiments, wherein the first strip seal may include a radially extending seal strip and a leg that extends axially away from the seal strip. The leg may extend into the first slot to interlock the first strip seal with the rod seal.

In some embodiments, the leg of the first strip seal may be spaced apart from at least one of the body and the first hook arm of the rod seal to allow for thermal growth between the first strip seal and the rod seal during use of the gas turbine engine assembly. In some embodiments, the seal strip may have a width, the leg may have a width, and the rod seal may have a width in a circumferentially direction. The width of the seal strip may be greater than the width of the rod and the width of the leg.

In some embodiments, the gas turbine engine assembly may further include a second strip seal that includes a radially extending seal strip and a leg that extends axially away from the seal strip of the second strip seal. The rod seal may further include a second hook arm that extends away from the body of the rod seal to form a second slot between the body and the second hook arm. The leg of the second strip seal may extend into the second slot to interlock the second strip seal with the rod seal.

In some embodiments, the rod seal may further include a locator flange that extends radially outward away from the body. The locator flange may include a radially extending planar surface. The locator flange may be axially spaced apart from the first hook arm.

In some embodiments, the rod seal may further include a second hook arm that extends away from the body of the rod seal to form a second slot between the body and the second hook arm. The second hook arm may be axially spaced apart from the first hook arm to axially locate the locator flange between the first hook arm and the second hook arm.

In some embodiments, the first strip seal may include a seal strip and a leg that extends away from the seal strip. The first strip seal may be formed from a single sheet of material having a uniform thickness.

In some embodiments, the first strip seal may include a seal strip and a leg. The strip seal may define an apex. The seal strip and the leg may extend linearly away from the apex of the strip seal.

In some embodiments, the first strip seal may include a radially extending seal strip formed from a single sheet of material having a uniform thickness and an L-shaped leg coupled to the seal strip. The seal strip and the leg may cooperate to define an angle alpha. The angle alpha may be about 90 degrees.

According to another aspect of the present disclosure, a gas turbine engine assembly may include a first component, a second component, and a seal assembly. The first component may be formed to include a first slot that extends into the first component. The second component may be formed to include a second slot that extends into the second component. The second component may be arranged adjacent to the first component to define a gap therebetween. The seal assembly may be arranged between the first component and the second component. The seal assembly may include a strip seal and a rod seal. The strip seal may extend circumferentially into the first slot formed in the first component and the second slot formed in the second component. The rod seal may be arranged in the gap defined by the first component and the second component. The rod seal may be interlocked with the strip seal for radial movement therewith.

In some embodiments, the rod seal may include a body and a hook arm. The body may be arranged to extend axially relative to a central axis of the gas turbine engine assembly. The hook arm may be arranged to extend away from the body to form an opening between the body and the hook arm.

In some embodiments, the rod seal may further include a locator flange. The locator flange may extend radially outward away from the body. The locator flange may include a radially extending planar surface. The locator flange may be axially spaced apart from the hook arm.

In some embodiments, the strip seal includes a seal strip and a leg that extends away from the seal strip. In some embodiments, the strip seal extends radially relative to a central axis of the gas turbine engine assembly. The seal strip may have a width and the leg may have a width in a circumferential direction. The width of the seal strip may be greater than the width of the leg.

In some embodiments, the rod seal may include a body and a hook arm arranged to extend away from the body to form an opening between the body and the hook arm. The leg of the strip seal may be received in the opening. The leg may be spaced apart from at least one of the body and the hook arm.

In some embodiments, the leg may be L-shaped and brazed with the seal strip. In some embodiments, the seal strip and the leg may cooperate to define an angle alpha and the angle alpha may be about 90 degrees.

In some embodiments, the strip seal may define an apex. The seal strip and the leg may extend linearly away from the apex.

These and other features of the present disclosure will become more apparent from the following description of the illustrative embodiments.

DETAILED DESCRIPTION

Figure 1:
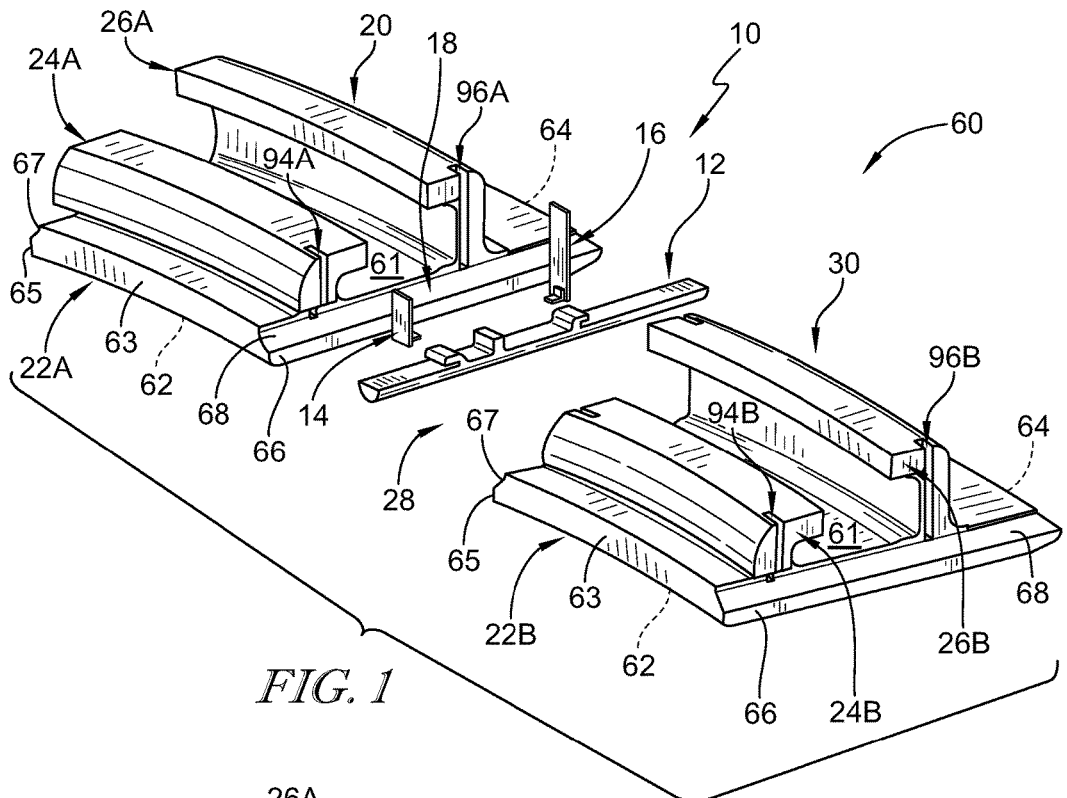
FIG. 1 is an exploded perspective view of a gas turbine engine assembly including a first blade track component, a second blade track component, and a seal assembly adapted to block gasses from passing through a gap formed at an interface between the first blade track component and the second blade track component showing that the seal assembly includes a rod seal, a forward strip seal, and an aft strip seal.

For the purposes of promoting an understanding of the principles of the disclosure, reference will now be made to a number of illustrative embodiments shown in the drawings and specific language will be used to describe the same.

A seal assembly 10 is adapted to close a gap 18 formed between first and second adjacent components 20, 30 in a gas turbine engine assembly 60 as shown in FIGS. 1-6. The gas turbine engine assembly 60 separates a high pressure zone HP from a low pressure zone LP within a gas turbine engine (not shown) as suggested in FIGS. 1 and 2. The seal assembly 10 is arranged in the gap 18 formed by the adjacent components 20, 30 to block gasses from passing through the gap 18 between the high pressure zone HP and the low pressure zone LP during use of the gas turbine engine assembly 60.

Figure 2:
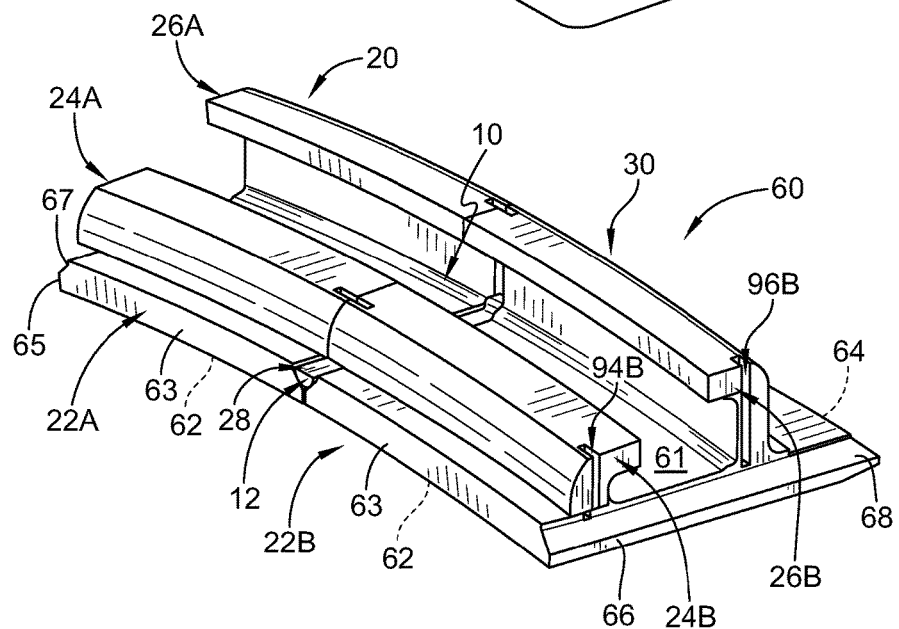
FIG. 2 is a perspective view of the gas turbine engine assembly from FIG. 1 assembled to show that the seal assembly is received in a channel formed between the first blade track component and the second blade track component.

As shown in FIG. 2, the components 20, 30 are positioned adjacent one another about a central axis of the gas turbine engine assembly 60. Each of the components 20, 30 are substantially similar and each includes a panel 22A, 22B, a forward hanger 24A, 24B, and an aft hanger 26A, 26B as shown in FIGS. 1 and 2. The seal assembly 10 includes a rod seal 12, a forward strip seal 14, and an aft strip seal 16. The rod seal 12 is arranged in a channel 28 formed by the panel 22A and the panel 22B to block gasses from passing between the panels 22A, 22B. The forward strip seal 14 extends into the forward hanger 24A and the forward hanger 24B to block gasses from passing therebetween. The aft strip seal 16 extends into the aft hanger 26A and the aft hanger 26B to block gasses from passing therebetween.

During operation of the gas turbine engine assembly 60, the components 20, 30 may heat and cool and grow relative to one another. The seals 12, 14, 16 are free to move relative to the components 20, 30 to allow for the relative movement and thermal growth of the components 20, 30. The forward strip seal 14 and the aft strip seal 16 are arranged to be interlocked with the rod seal 12 for radial movement therewith to block gasses from passing between the rod seal 12 and the forward strip seal 14 and to block gasses from passing between the rod seal 12 and the aft strip seal 16 as suggested in FIG. 6. As a result, any gaps between the strip seals 14, 16 and the rod seal 12 are minimized or eliminated.

Figure 3:
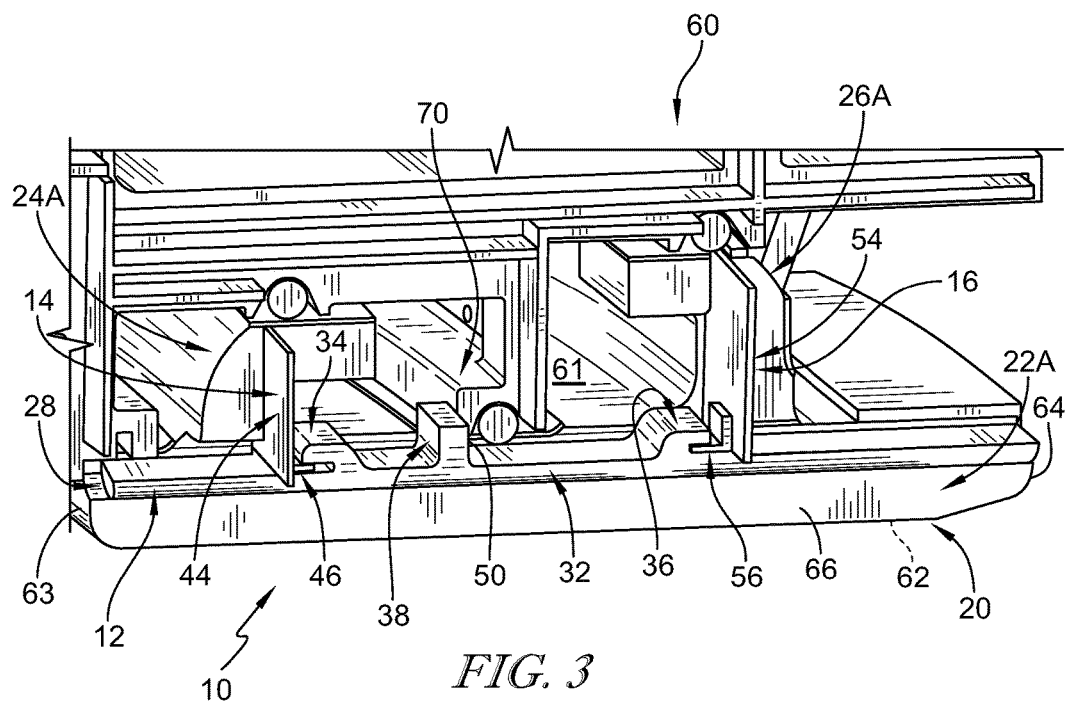
FIG. 3 is a perspective view of the seal assembly and first blade track component of FIG. 1 showing the forward strip seal interlocked with a forward hook arm of the rod seal and the aft strip seal interlocked with an aft hook arm of the rod seal for radial movement therewith.
Figure 4:
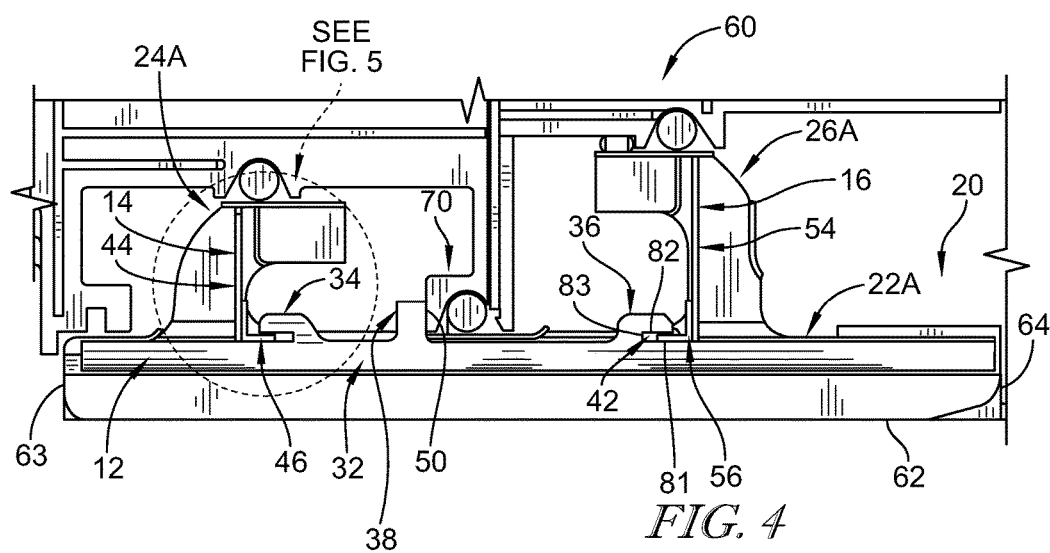
FIG. 4 is a cross sectional view of the seal assembly and first blade track component of FIG. 1 showing that the rod seal further includes a locator flange configured to abut a ground component of the gas turbine engine to axial locate the rod seal in the gas turbine engine.
Figure 5:
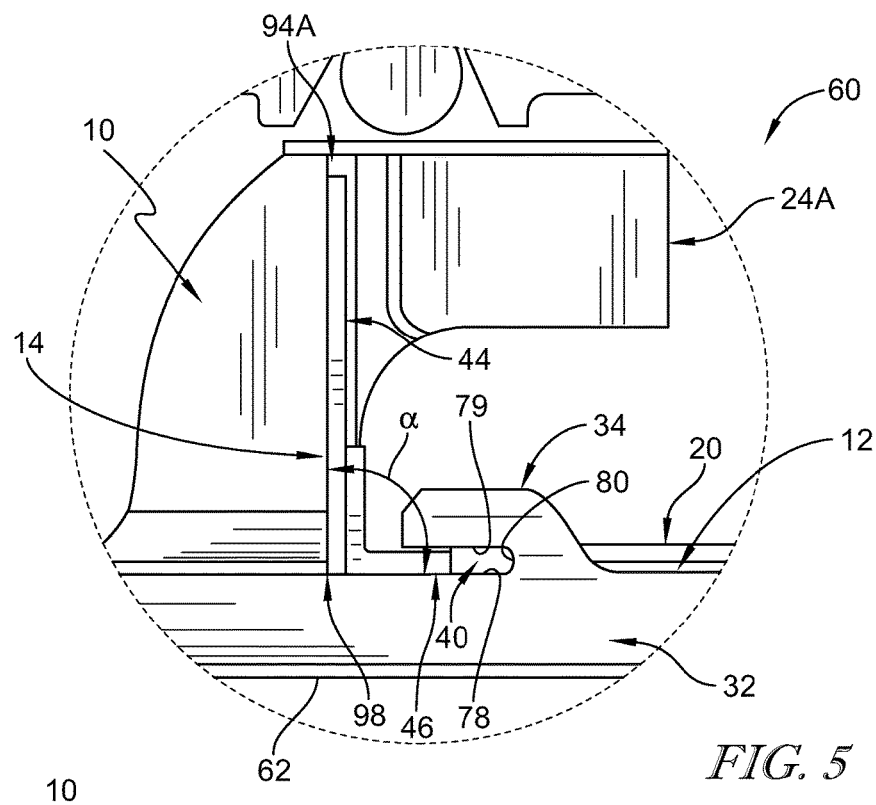
FIG. 5 is detail view of a portion of FIG. 4 showing that the forward strip seal includes a seal strip and an L-shaped leg that extends away from the seal strip into a slot formed by the forward hook arm to couple the forward strip seal with the rod seal.

In the illustrative embodiment, the rod seal 12 includes a body 32 that extends axially relative to the center axis, a forward hook arm 34, and an aft hook arm 36 that is axially spaced apart from the forward hook arm 34 as shown in FIGS. 3-5. The body 32 is adapted to be located in the channel 28 to block gasses from passing through the channel 28. A portion of the forward strip seal 14 is arranged to interlock with the forward hook arm 34. A portion of the aft strip seal 16 is arranged to interlock with the aft hook arm 36 included in the rod seal 12.

Illustratively, the rod seal 12 further includes a locator flange 38 that extends radially outward away from the body 32 as shown in FIGS. 3 and 4. The locator flange 38 is adapted to engage structure surrounding the gas turbine engine assembly 60 such as, for example, the ground component 70 as shown in FIG. 3, to axially locate the seal assembly 10. The illustrative locator flange 38 includes a radially extending planar surface 50 adapted to abut the ground component 70 to block axial movement of the seal assembly 10 relative to the ground component 70.

Each of the components 20, 30 are substantially similar and each includes the panel 22A, 22B, the forward hanger 24A, 24B, and the aft hanger 26A, 26B respectively as shown in FIGS. 1 and 2. Each panel 22A, 22B of the components 20, 30 is illustratively formed to include a high pressure surface 61 and a low pressure surface 62 as shown in FIG. 2. The high pressure surface 61 faces the high pressure zone HP and the low pressure surface 62 is opposite the high pressure surface 61 and faces the low pressure zone LP. Each panel 22A, 22B is also formed to include a forward surface 63, an aft surface 64, a left side surface 65, and a right side surface 66 as shown in FIGS. 1 and 2.

Additionally, in the illustrative embodiment, each panel 22A, 22B is formed to include a left chamfer surface 67 and a right chamfer surface 68 as shown in FIG. 1. The left chamfer surface 67 extends at an angle generally from the high pressure surface 61 to the left side surface 65 of the panel 22A, 22B. The right chamfer surface 68 extends at an angle generally from the high pressure surface 61 to the right side surface 66 of the panel 22A, 22B. The left chamfer surface 67 and the right chamfer surface 68 may be generally flat or barreled (curved).

Figure 6:
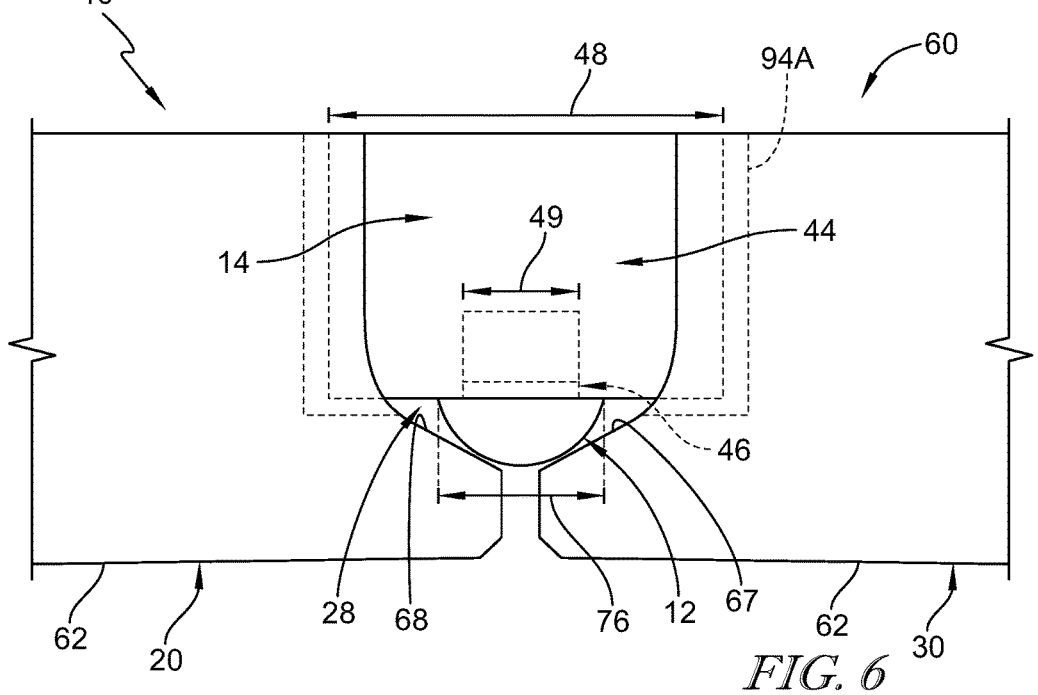
FIG. 6 is an enlarged forward view of the gas turbine engine assembly of FIG. 2 looking aft and showing the rod seal and forward strip seal located in the gap formed at the interface between the first blade track component and the second blade track component.

The left chamfer surface 67 and the right chamfer surface 68 extend along the corresponding left side surface 65 and the right side surface 66 from the forward surface 63 to the aft surface 64 as shown in FIG. 1. Accordingly, the channel 28 extends from the forward surface 63 to the aft surface 64 of the panels 22A, 22B included in the first component 20 and the second component 30. The channel 28 is illustratively shaped with straight sides forming a generally triangular space for the rod seal 12 as shown in FIG. 6. In other embodiments, the channel 28 may have curved or otherwise shaped sides that provide a space for the rod seal 12.

The forward hanger 24A and the aft hanger 26A are integral with the panel 22A of the first component 20 and are adapted for coupling the panel 22A of the first component 20 with structure surrounding the gas turbine engine assembly 60 as suggested in FIGS. 1 and 2. In the illustrative embodiment, the forward hanger 24A and the aft hanger 26A are generally L-shape and adapted to hang from brackets in a support structure. In other embodiments, the forward hanger 24A and the aft hanger 26A may be dovetail shaped, may have pin-receiving holes, or have any other suitable shape for coupling the gas turbine engine assembly 60 with other structures.

The forward hanger 24B and the aft hanger 26B of the second component 30 are substantially similar to the hangers 24A, 26A and are not discussed in detail. The forward hangers 24A, 24B and the aft hangers 26A, 26B are sometimes referred to as attachment features.

Each of the forward hangers 24A, 24B is formed to include a slot 94A, 94B sized to receive the forward strip seal 14 as shown in FIGS. 1 and 2. The slots 94A, 94B of adjacent components 20, 30 cooperate to receive the strip seal 14. Each of the aft hangers 26A, 26B is formed to include a slot 96A, 96B sized to receive the aft strip seal 16.

Illustratively, the gas turbine engine assembly 60 includes the ground component 70 as shown in FIGS. 3 and 4. The ground component 70 is arranged between the forward hangers 24A, 24B and the aft hangers 26A, 26B. The gas turbine engine assembly 60 may further include seals located between the ground component 70 and the components 20, 30 as shown in FIG. 3.

The seal assembly 10 is arranged in the channel 28 formed between the first component 20 and the second component 30 as shown in FIGS. 1-3. The seal assembly 10 illustratively includes the rod seal 12, the forward strip seal 14, and the aft strip seal 16. The forward strip seal 14 and the aft strip seal 16 are interlocked with the rod seal 12 for radial movement therewith.

The rod seal 12 is arranged in the channel 28 formed by the left chamfer surface 67 and the right chamfer surface 68 to block gasses from passing between the panels 22A, 22B as suggested in FIGS. 2-4 and 6. The rod seal 12 illustratively comprises ceramic matrix composite materials. In other embodiments, the rod seal 12 comprises ceramic monolithic materials, metallic materials, or other suitable materials. The rod seal 12 has a width 76 measured in the circumferential direction as shown in FIG. 6.

In the illustrative embodiment, the rod seal 12 includes the body 32 that extends axially relative to the center axis, the forward hook arm 34, and the aft hook arm 36 axially spaced apart from the forward hook arm 34 as shown in FIGS. 1-3. In illustrative embodiments, the body 32, the forward hook arm 34, and the aft hook arm 36 are integrally formed to provide a monolithic rod seal 12.

The body 32 is adapted to be located in the channel 28 to block gasses from passing through the channel 28 as shown in FIGS. 3, 4, and 6. The body 32 is illustratively sized to extend from the forward surfaces 63 to the aft surfaces 64 of the panels 22A, 22B as shown in FIG. 3. In the illustrative embodiment, the body 32 has a semicircular cross sectional profile. In other embodiments, the body 32 may have a round cross sectional profile, a circular cross sectional profile, an elliptical cross sectional profile, or a polygonal cross sectional profile.

The forward hook arm 34 extends away from the body 32 to form a forward slot 40 between the body 32 and the forward hook arm 34 as shown in FIG. 5. Illustratively, the forward hook arm 34 extends radially outward away from the body 32 and axially forward to define the forward slot 40. A leg 46 of the forward strip seal 14 is arranged to extend into the forward slot 40 to interlock the forward strip seal 14 with the rod seal 12 as shown in FIGS. 3-5.

The forward hook arm 34 includes a radially outward-facing surface 78, a radially inward-facing surface 79, and an end surface 80 that extends between and interconnects the radially outward-facing surface 78 and the radially inward-facing surface 79 as shown in FIG. 5. The radially outward-facing surface 78, radially inward-facing surface 79, and the end surface 80 define a portion of the forward slot 40. The radially outward-facing surface 78 and the radially inward-facing surface 79 are radially spaced apart from one another such that the leg 46 of the forward strip seal 14 contacts only one of the radially outward-facing surface 78 and the radially inward-facing surface 79 at a time. In illustrative embodiments, the forward slot 40 has an axial length that is larger than an axial length of the leg 46 such that the forward hook arm 34 blocks the leg 46 from contacting the end surface 80.

The aft hook arm 36 is axially spaced apart from the forward hook arm 34 as shown in FIGS. 3 and 4. The aft hook arm 36 extends away from the body 32 to form an aft slot 42 between the body 32 and the aft hook arm 36. Illustratively, the aft hook arm 36 extends radially outward away from the body 32 and axially aft to define the aft slot 42. A leg 56 of the aft strip seal 16 is arranged to extend into the aft slot 42 to interlock the aft strip seal 16 with the rod seal 12 as shown in FIG. 3.

The aft hook arm 36 includes a radially outward-facing surface 81, a radially inward-facing surface 82, and an end surface 83 that extends between and interconnects the radially outward-facing surface 81 and the radially inward-facing surface 82. The radially outward-facing surface 81, radially inward-facing surface 82, and the end surface 83 define a portion of the aft slot 42. The radially outward-facing surface 81 and the radially inward-facing surface 82 are radially spaced apart from one another such that the leg 56 may contact only one of the radially outward-facing surface 81 and the radially inward-facing surface 82 at a time. In some embodiments, the aft slot 42 has an axial length that is larger than an axial length of the leg 56 such that the aft hook arm 36 blocks the leg 56 from contacting the end surface 83.

Illustratively, the rod seal 12 further includes a locator flange 38 that extends radially outward away from the body 32 as shown in FIG. 3. The locator flange 38 is adapted to engage structure surrounding the gas turbine engine assembly 60 such as, for example, the ground component 70, to axially locate the seal assembly 10. The locator flange 38 includes a radially extending planar surface 50 adapted to abut the ground component 70 to block axial movement of the rod seal 12 relative to the ground component 70.

The forward strip seal 14 includes a radially extending seal strip 44 and a leg 46 as shown in FIG. 3. The seal strip 44 extends circumferentially across the gap 18 into the slots 94A, 94B formed in the forward hangers 24A, 24B. The leg 46 extends axially away from the seal strip 44 and is arranged to extend into the forward slot 40 to interlock the forward strip seal 14 with the rod seal 12. As shown in FIG. 5, the leg 46 of the forward strip seal 14 is spaced apart from one of the body 32 and the forward hook arm 34 of the rod seal 12 to allow for thermal growth between the components during use of the gas turbine engine assembly 60.

The seal strip 44 of the forward strip seal 14 has a width 48 and the leg 46 has a width 49 as shown in FIG. 6. Illustratively, the width 76 of the rod seal 12 is greater than the width 49 of the leg. The width 48 of the seal strip 44 is greater than the width 76 of the rod and the width 49 of the leg. As such, the leg 46 is free to move circumferentially relative to the rod seal 12 in the forward slot 40. The seal strip 44 is free to move circumferentially relative to the components 20, 30 in the slots 94A, 94B. The rod seal 12, forward strip seal 14, and the aft strip seal 16 are free to move radially inward and outward relative to the components 20, 30.

In illustrative embodiments, the leg 46 and the seal strip 44 define an apex as shown in FIG. 5. The seal strip 44 and the leg 46 extend linearly away from the apex 98. As such, the leg 46 and the seal strip 44 cooperate to define an angle alpha therebetween as shown in FIG. 5. In illustrative embodiments, the angle alpha is about 90 degrees. In some embodiments, the angle alpha is greater than 90 degrees. In some embodiments, the angle alpha is less than 90 degrees. Illustratively, the leg 46 and the seal strip 44 cooperate to form a sharp point (not a radius) to minimize or eliminate bypass flow around the strip seal 14.

In some embodiments, the seal strip 44 and the leg 46 are separate components and the leg 46 is coupled to the seal strip 44 as suggested in FIG. 5. In illustrative embodiments, the seal strip 44 is formed from a single sheet of material having a uniform thickness to provide a flat plate as shown in FIGS. 3-5. The leg 46 is L-shaped and coupled to the seal strip 44. In some embodiments, the leg 46 is welded or brazed to the seal strip 44. In some embodiments, the strip seal 14 is formed through a metal injection molding process. As a result, the seal strip 44 and the leg 46 made integral as one piece through the metal injection molding process.

The aft strip seal 16 includes a radially extending seal strip 54 and a leg 56 as shown in FIG. 3. The seal strip 54 extends circumferentially across the gap 18 into the slots 96A, 96B formed in the aft hangers 26A, 26B. The leg 56 extends axially away from the seal strip 54 and is arranged to extend into the aft slot 42 to interlock the aft strip seal 16 with the rod seal 12. The leg 56 is spaced apart from one of the body 32 and the aft hook arm 36 of the rod seal 12 to allow for thermal growth between the components during use of the gas turbine engine assembly 60. The aft strip seal 16 is substantially similar to the forward strip seal 14 and is not discussed in detail.

Figure 7:
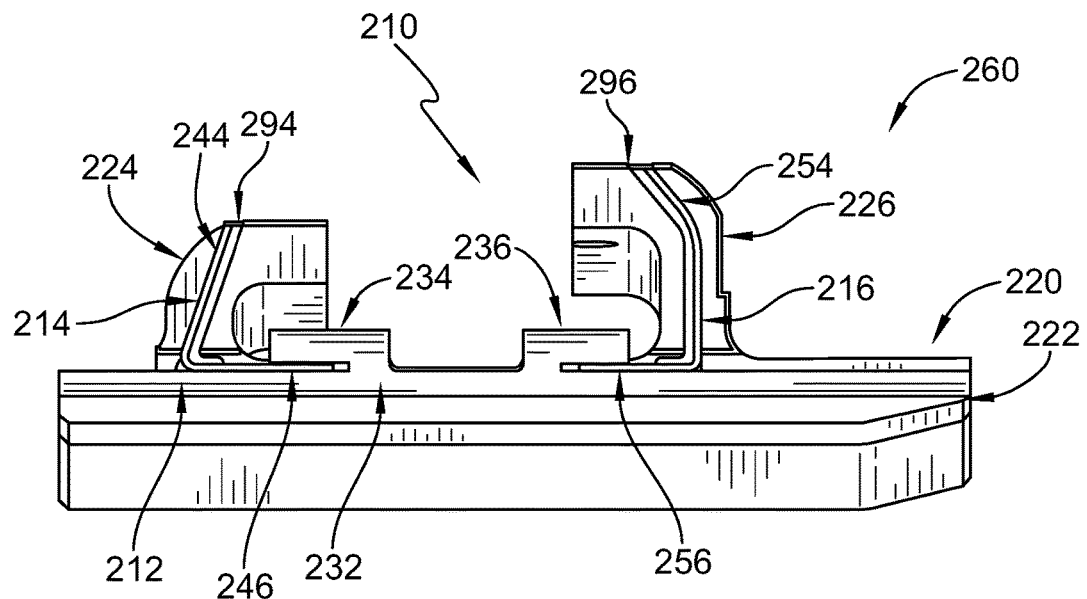
FIG. 7 is a side view of another embodiment of a gas turbine engine assembly including a first blade track component, a second blade track component, and a seal assembly adapted to block gasses from passing through a gap formed at an interface between the first blade track component and the second blade track component showing that the seal assembly includes a rod seal, a forward strip seal, and an aft strip seal.
Figure 8:
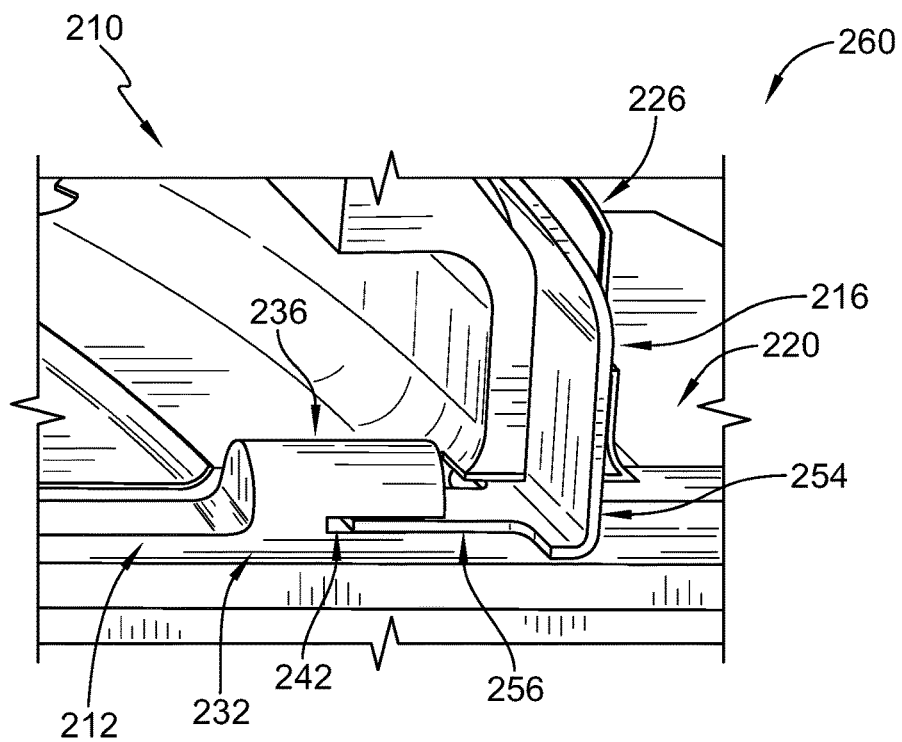
FIG. 8 is a perspective view of the gas turbine engine assembly of FIG. 7 showing that the aft strip seal includes a seal strip and a leg that are formed from a single sheet of material and that the leg extends into a slot formed by an aft hook arm of the rod seal to interlock the aft strip seal and the rod seal.

Another embodiment of a seal assembly 210 for use in a gas turbine engine assembly 260 is shown in FIGS. 7 and 8. The seal assembly 210 is substantially similar to the seal assembly 10 shown in FIGS. 1-6 and described herein. Accordingly, similar reference numbers in the 200 series indicate features that are common between the seal assembly 10 and the seal assembly 210. The description of the seal assembly 10 is incorporated by reference to apply to the seal assembly 210, except in instances when it conflicts with the specific description and the drawings of the seal assembly 210.

The seal assembly 210 includes the rod seal 212, a forward strip seal 214, and an aft strip seal 216 as shown in FIG. 7. The rod seal 212 includes an aft hook arm 236 having a semi-circular cross section as shown in FIGS. 7 and 8. The aft strip seal 216 includes a seal strip 254 and a leg 256.

The seal strip 254 and the leg 256 are formed from a monolithic component as shown in FIGS. 7 and 8. A single sheet of material may be contoured and machined to provide the seal strip 254 and the leg 256. The illustrative seal strip 254 is contoured to fit in a contoured slot 96A of component 220. The leg 256 extends axially away from an inner end of the seal strip 254. The single sheet of material of the aft strip seal 216 has been machined to reduce a width 249 of the leg such that the width 249 of the leg 256 is less than a width 248 of the seal strip 254. The forward seal strip 214 is substantially similar to the aft strip seal 216 and is not discussed in detail.

In some embodiments of a gas turbine engine, an outer annulus of a hot gas flow path is defined by the segment components such as, for example, shroud or blade track components. As a result, the segment components may shield other components such as, for example, carriers and casings, outside of the segment components from high flow path temperatures. The segment components may be bathed in cooling air at a lower temperature and higher pressure than the flow path gasses for their survivability.

One function of the segments may be to minimize the leakage of the higher pressure cooling air into the flow path to help maximize engine efficiency. To account for thermal movements of the casings and other components, the outer annulus may be made from a number of segments around the annulus. Throughout the engine cycle, the segments may move together and apart. The inter-platform (circumferential) gaps between segments may open and close through engine operation. These gaps are typically closed up to seal the cooling air system from the flow path, high temperature air. One embodiment of this seal includes a thin, planar, sheet metal, strip seal that fits into opposing grooves in adjacent metallic segments.

When working with segments made from ceramic matrix composite material systems, seals and simple grooves may provide challenges. A groove feature created in a ceramic matrix composite member (flow path runner) that directly separates the hot and cold air may create high stresses from the combination of a high thermal gradient through the part thicknesses and the geometric stress riser from the then groove feature itself and associated fillets. The thermal stress issue may be exaggerated in the ceramic matrix composite due to a lower thermal conductivity of the material in comparison to a metal segment. In some embodiments, the thin strip seal could be replaced by a rod seal along the flow path.

As shown in FIG. 3, a sheet metal strip seal may be used in the vertical hangers of the segments to seal the segment cavity axially on the forward and aft sides. The thermal gradient through the hangers may be smaller when compared to the thermal gradient through the flow path runner allowing this seal configuration in the hangers of the segment.

In assemblies where the strip seals are not interconnected with the rod seal, the vertical strip seals in the hangers may remain static in position due to the pressure load acting across them. The rod seal however may not stay static with respect to the vertical strip seals. As the gap between segments open and close, the rod seal position could move radially with respect to the strip seals since the rod seal is seated on a chamfered surface of the segment. A leakage area may exist between segments, rod seal, and strip seal. This area may grow as the inter-platform gap grows.

The present disclosure addresses the above issue among other things. In some embodiments, the radial location of the rod seal and the strip seals are tied together. The illustrative rod seal has opposing hook features created to radially tie the location of the strip seal to the rod seal. This may eliminate/minimize the gap between the rod seal and the strip seal. Each of the strip seals illustratively include a horizontal leg that fits in the groove formed by the hooks in the rod seal as a locating function.

Illustratively, the width of the groove is larger than the thickness of the strip seal. As such, the strip seal may be allowed to slide horizontally with respect to the rod seal which may be helpful because the horizontal distance between the forward seal and aft strip seal may be dependent on the growth of the ceramic matrix composite segment (low alpha). The horizontal distance between the rod seal hooks may grow differently since it may be made from a metal material such as, for example, a high temperature nickel or cobalt alloy (higher alpha). Maintaining strip seal freedom to move axially and seal against the sealing surface in the segment hangers may reduce leakages.

Illustrative embodiments show a strip seal with a vertical leg and a horizontal gap. In some embodiments, the external corner between these legs is a sharp corner. The sharp corner may eliminate or reduce an additional bypass area. This sharp corner may be made by joining two components with brazing, welding, etc, could be machined out of stock material, could be produced with metal injection molding, or could be produced with additive material technology (3D metal "printing"). In other embodiments, the strip seals are made from a single piece of bent sheet metal.

In the illustrative embodiment, the components 20, 30 are blade track segments 20, 30 made from ceramic matrix materials that may be used with other blade track segments to provide a ring that extends around the center axis of the gas turbine engine assembly 60. The ring is arranged around rotating turbine wheels used in the gas turbine engine to form a gas path for directing gases through the gas turbine engine. In some embodiments, the components 20, 30 are made from materials other than ceramic matrix composite materials. In other embodiments, the components 20, 30 are adapted for use as combustor tiles included in the combustor of a gas turbine engine or as heat shields included in other sections of a gas turbine engine.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising
a first component comprising ceramic matrix materials, the first component including a first panel formed to include a first chamfer surface and a first attachment feature that extends from the first panel to mount the first panel relative to other components within the gas turbine engine assembly,
a second component comprising ceramic matrix materials, the second component including a second panel formed to include a second chamfer surface and a second attachment feature that extends from the second panel to mount the second panel relative to other components within the gas turbine engine assembly, the second component being circumferentially spaced apart from the first component about a center axis of the gas turbine engine assembly to form a gap therebetween, and
a seal assembly arranged between the first component and the second component to block gasses from passing through the gap, the seal assembly including a first strip seal that extends circumferentially into the first attachment feature and the second attachment feature to block gasses from passing between the first attachment feature and the second attachment feature and a rod seal arranged in a channel formed by the first chamfer surface and the second chamfer surface to block gasses from passing between the first panel and the second panel and the first strip seal is interlocked with the rod seal for radial movement therewith to block gasses from passing between the rod seal and the first strip seal.

2. The gas turbine engine assembly of claim 1, wherein the rod seal includes a body that extends axially relative to the center axis and a first hook arm that extends away from the body to form a first slot between the body and the first hook arm and a portion of the first strip seal extends into the first slot to interlock the first strip seal and the rod seal.

3. The gas turbine engine assembly of claim 2, wherein the first strip seal includes a radially extending seal strip and a leg that extends axially away from the seal strip and the leg extends into the first slot to interlock the first strip seal with the rod seal.

4. The gas turbine engine assembly of claim 3, wherein the leg of the first strip seal is spaced apart from at least one of the body and the first hook arm of the rod seal to allow for thermal growth between the first strip seal and the rod seal during use of the gas turbine engine assembly.

5. The gas turbine engine assembly of claim 3, wherein the seal strip has a width, the leg has a width, and the rod seal has a width in a circumferentially direction and the width of the seal strip is greater than the width of the rod and the width of the leg.

6. The gas turbine engine assembly of claim 3, further comprising a second strip seal that includes a radially extending seal strip and a leg that extends axially away from the seal strip of the second strip seal, the rod seal further includes a second hook arm that extends away from the body of the rod seal to form a second slot between the body and the second hook arm, and the leg of the second strip seal extends into the second slot to interlock the second strip seal with the rod seal.

7. The gas turbine engine assembly of claim 2, wherein the rod seal further includes a locator flange that extends radially outward away from the body, the locator flange includes a radially extending planer surface, and the locator flange is axially spaced apart from the first hook arm.

8. The gas turbine engine assembly of claim 7, wherein the rod seal further includes a second hook arm that extends away from the body of the rod seal to form a second slot between the body and the second hook arm and the second hook arm is axially spaced apart from the first hook arm to axially locate the locator flange between the first hook arm and the second hook arm.

9. The gas turbine engine assembly of claim 2, wherein the first strip seal includes a seal strip and a leg that extends away from the seal strip and the first strip seal is formed from a single sheet of material having a uniform thickness.

10. The gas turbine engine assembly of claim 1, wherein the first strip seal includes a seal strip and a leg, the strip seal defines an apex, and the seal strip and the leg extend linearly away from the apex of the strip seal.

11. The gas turbine engine assembly of claim 1, wherein the first strip seal includes a radially extending seal strip formed from a single sheet of material having a uniform thickness and an L-shaped leg coupled to the seal strip, the seal strip and the leg cooperate to define an angle alpha, and the angle alpha is about 90 degrees.

12. A gas turbine engine assembly comprising
a first component formed to include a first slot that extends into the first component,
a second component formed to include a second slot that extends into the second component, the second component arranged adjacent to the first component to define a gap therebetween, and
a seal assembly arranged between the first component and the second component, the seal assembly including a strip seal that extends circumferentially into the first slot formed in the first component and the second slot formed in the second component and a rod seal arranged in the gap defined by the first component and the second component, and the rod seal is interlocked with the strip seal for radial movement therewith.

13. The gas turbine engine assembly of claim 12, wherein the rod seal includes a body arranged to extend axially relative to a central axis of the gas turbine engine assembly and a hook arm arranged to extend away from the body to form an opening between the body and the hook arm.

14. The gas turbine engine assembly of claim 13, wherein the rod seal further includes a locator flange that extends radially outward away from the body, the locator flange includes a radially extending planer surface, and the locator flange is axially spaced apart from the hook arm.

15. The gas turbine engine assembly of claim 12, wherein the strip seal includes a seal strip and a leg that extends away from the seal strip.

16. The gas turbine engine assembly of claim 15, wherein the strip seal extends radially relative to a central axis of the gas turbine engine assembly, the seal strip has a width and the leg has a width in a circumferential direction, and the width of the seal strip is greater than the width of the leg.

17. The gas turbine engine assembly of claim 15, wherein the rod seal includes a body and a hook arm arranged to extend away from the body to form an opening between the body and the hook arm, the leg of the strip seal is received in the opening, and the leg is spaced apart from at least one of the body and the hook arm.

18. The gas turbine engine assembly of claim 17, wherein the leg is L-shaped and brazed with the seal strip.

19. The gas turbine engine assembly of claim 17, wherein the seal strip and the leg cooperate to define an angle alpha and the angle alpha is about 90 degrees.

20. The gas turbine engine assembly of claim 15, wherein the strip seal defines an apex and the seal strip and the leg extend linearly away from the apex.

* * * * *